(12) United States Patent
Watson et al.

(10) Patent No.: US 7,703,240 B2
(45) Date of Patent: Apr. 27, 2010

(54) AUTOMATIC SUBTERRANEAN WATERING DEVICE

(76) Inventors: Milton Watson, 8314 Batesville Pike, Jacksonville, AR (US) 72076; Chad Collins, P.O. Box 56523, Little Rock, AR (US) 72215

( * ) Notice: Subject to any disclaimer, the term of this patent is extended or adjusted under 35 U.S.C. 154(b) by 298 days.

(21) Appl. No.: 11/957,371

(22) Filed: Dec. 14, 2007

(65) Prior Publication Data

US 2009/0151246 A1    Jun. 18, 2009

(51) Int. Cl.
*A01G 27/02* (2006.01)

(52) U.S. Cl. ............................................. 47/79; 47/65.5

(58) Field of Classification Search ............... 47/79, 47/80, 81, 82, 48.5, 66.1, 65.5, 62 A, 59 R, 47/66.7
See application file for complete search history.

(56) References Cited

U.S. PATENT DOCUMENTS

| 3,733,746 | A |   | 5/1973  | Allen, Jr. |       |
|-----------|---|---|---------|------------|-------|
| 3,753,315 | A |   | 8/1973  | Adam       |       |
| 3,758,987 | A |   | 9/1973  | Crane, Jr. |       |
| 3,775,904 | A |   | 12/1973 | Peters     |       |
| 4,527,354 | A | * | 7/1985  | Sellier    | 47/81 |
| 4,578,897 | A |   | 4/1986  | Pazar et al. |     |
| 4,864,771 | A |   | 9/1989  | Fah        |       |
| 4,885,870 | A |   | 12/1989 | Fong       |       |
| 4,993,186 | A |   | 2/1991  | Immonen    |       |
| 5,046,282 | A |   | 9/1991  | Whitaker   |       |
| 5,097,626 | A |   | 3/1992  | Mordoch    |       |
| 5,502,924 | A |   | 4/1996  | Lee        |       |
| 5,671,562 | A |   | 9/1997  | Fah        |       |
| 5,921,025 | A |   | 7/1999  | Smith      |       |
| 6,134,833 | A |   | 10/2000 | Bachman et al. |   |
| 6,219,969 | B1 | * | 4/2001 | Dion       | 47/79 |
| 6,276,090 | B1 | * | 8/2001 | Lai        | 47/79 |
| 6,279,265 | B1 |   | 8/2001 | Scannell, Jr. |    |
| 6,345,470 | B1 | * | 2/2002 | Slaght et al. | 47/79 |
| 6,363,658 | B1 |   | 4/2002 | Lai        |       |
| 6,418,664 | B1 |   | 7/2002 | Shaw       |       |
| 6,505,440 | B1 |   | 1/2003 | Lai        |       |
| 6,622,430 | B1 | * | 9/2003 | Lai        | 47/79 |
| 6,672,007 | B1 | * | 1/2004 | Lai        | 47/79 |
| 6,715,233 | B2 |   | 4/2004 | Lyon       |       |

* cited by examiner

*Primary Examiner*—T. Nguyen
(74) *Attorney, Agent, or Firm*—QuickPatents, Inc.; Kevin Prince

(57) ABSTRACT

An automatic watering system for a plant growing in a growth medium, wherein the system comprises a water storage reservoir substantially filled with water and an air-tight closure that substantially seals a fill aperture. Water flows out of a reservoir drain opening through a water drain conduit and air in a water feed reservoir escapes through an air return conduit and into the water storage reservoir until a float valve seals the lower end of the air return conduit. Water thereafter flows into a growth medium through water feed apertures until the water level in a water feed reservoir drops below a water drain conduit and air is allowed to escape into the water storage reservoir therethrough. Thereafter the pressure differential between the water storage reservoir and the water feed reservoir is equalized, releasing the float valve to repeat the cycle. The latent heat generated by the roots of the plant evaporates water in the growth medium to allow the water storage reservoir to supply water to the growth medium.

5 Claims, 2 Drawing Sheets

AUTOMATIC SUBTERRANEAN WATERING DEVICE

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to plant pots, and more particularly to a self-watering plant pot.

DISCUSSION OF RELATED ART

Numerous innovations for plant watering devices have been provided in the prior art that will be described. Even though these innovations may be suitable for the specific individual purposes to which they address, they differ from the present invention in key ways.

A first example, U.S. Pat. No. 3,758,987, issued on Sep. 18, 1973, to Crane, Jr. teaches an automatic plant watering device responsive to the plant's need for water. The new watering device includes a porous sensing element that is inserted into the soil and responds to the moisture content of the soil to control the supply of water from a substantially airtight enclosure. The porous element constitutes an air valve. When the soil is relatively dry, air flows through the porous element, and water is released from the enclosure to the soil. When the soil is wet, air cannot pass through the sensing element and the flow of water is automatically shut off. The invention is also directed, in part, to a novel sensing and control device for incorporation in an automatic plant watering device or system. The device uses a basically new principle of operation and has no moving parts. One drawback with this type of device is that a sensor (porous sensing element) must be utilized to trigger the release of water to the roots of the plant.

A second example, U.S. Pat. No. 5,046,282 to Whitaker teaches an automatic soil waterer, especially for potted plants, having an airtight water supply chamber with a discharge into the soil controlled by a hydrophilic probe element followed by a hydrophobic element, preferably with an entrapment chamber therebetween, passing soil air into the water supply chamber, thereby discharging a proportional amount of water into the soil, there being water discharge control by means of a well open to the water supply chamber discharge and with a capillary wick therein exposed to the rise of water in the well and extending into the soil to wet the same. One drawback with this type of device is that a sensor (hydrophilic probe element) must be utilized to trigger the release of water to the roots of the plant.

A third example, U.S. Pat. No. 5,097,626 to Mordoch teaches an automatic self-watering system for plants growing in a container that includes a water receptacle above the level of growing medium in the container. The water container may be of any appropriate shape, and may be attached to or located adjacent an upper edge of the container. Alternatively, the water container may have legs resting on or inserted in the growing medium, or may be hooked onto the edge of the container. The water receptacle may be formed separately from or integrally with the container. A conduit for transporting water is connected to an outlet in the side or base of the water receptacle and the conduit is engaged with a dryness sensor inserted in the growing medium in the container. The dryness sensor automatically closes the conduit when the growing medium is adequately irrigated, and opens the conduit to allow water to drip onto the growing medium when water is needed. The outlet from the conduit is positioned so that water drips, by gravity, onto the root area around a plant growing in the container. The container may also be used for holding a separate pot for a plant which fits in the container. One drawback with this type of device is that a sensor (dryness sensor) must be utilized to trigger the release of water to the roots of the plant.

A forth example, U.S. Pat. No. 6,134,833 to Bachman et al. teaches a self-regulating, automatic watering planter comprised of an inner shell and outer shell with a snap-fit engagement to form a reservoir for water between the walls of the inner and outer shells. The inner shell has small holes in the bottom thereof to allow water to enter soil contained in the inner shell. An airtight seal between the inner and outer shells creates a vacuum at the top of the reservoir as the water seeps through the holes and the water level drops. The water in the walls provides hydrostatic pressure that drives the water through the inlet holes. The water stops when the vacuum reaches a sufficient level to counteract the hydrostatic pressure. An air tube coupled to the air space on top of the reservoir and having a hydrophilic polyethylene sensor blocking one end is buried in the soil. The hydrophilic sensor blocks air flow into the air space when there is sufficient water in the soil, but when the soil is dry, the hydrophilic sensor lets air into the air space thereby lowering the vacuum level. This allows more water to enter the soil until the vacuum level again reaches a level to counteract the hydrostatic pressure. One drawback with this type of device is that a sensor (hydrophilic polyethylene sensor) must be utilized to trigger the release of water to the roots of the plant.

A fifth example, U.S. Pat. No. 6,715,233 to Lyon teaches a modular, expandable, self-regulating watering system for burial in planters, which do not have access to water pipes nearby for use in watering plants continuously with on the amount of water the plant needs and which can be refilled by relatively infrequent visits. The system is comprised of a plurality of hollow sections each of which has two upper ports and two lower ports, unless there are only two sections in which case only one upper port and one lower port is needed on each section. One section has a fill pipe that extends above the soil level. One section has an air port at the top thereof, or close to the top, which is coupled to an air tube, which is plugged at the other end with a hydrophilic sensor. Expansion sections can be added or subtracted to make the system larger or smaller. All sections are coupled together at their upper ports by flexible hose or tubing, and are coupled together by their lower ports by flexible hose or tubing. One drawback with this type of device is that a sensor (hydrophilic sensor) must be utilized to trigger the release of water to the roots of the plant.

A large number of other automatic watering plant pots utilize wicks, sponges, or the like to constantly supply water to a plant's root system. This constant moisture creates a root system that is always wet or damp, thus creating a condition called "root rot" that significantly weakens the plant and may even kill it.

None of the these prior art plant watering devices teaches an automatic watering system for a plant that allows the root system to dehydrate before another watering cycle is initiated.

It is apparent now that numerous innovations for plant watering devices have been provided in the prior art that are adequate for various purposes. Furthermore, even though these innovations may be suitable for the specific individual purposes to which they address, accordingly, they would not be suitable for the purposes of the present invention as heretofore described.

None of the aforementioned prior art plant watering devices teaches an automatic watering system for a plant that uses the latent heat generated by the roots of the plant to trigger a water storage reservoir to supply water to the soil in a periodic nature. Further, none of the prior art plant watering devices allow the soil to substantially dry out before instigating a watering event without the use of a soil moisture sensor. The present invention accomplishes this objective.

SUMMARY OF THE INVENTION

An object of the present invention is to provide an automatic watering system for a plant that avoids the disadvantages of the prior art.

Another object of the present invention is to provide an automatic watering system for a plant that is simple and inexpensive to manufacture.

Still another object of the present invention is to provide an automatic watering system for a plant that is simple to use.

Briefly stated, still yet another object of the present invention is to provide an automatic watering system for a plant growing in a growth medium. The system comprises a water storage reservoir substantially filled with water and an airtight closure that substantially seals a fill aperture. Water flows out of a reservoir drain opening through a water drain conduit into a water feed reservoir and air in a water feed reservoir escapes through an air return conduit and into the water storage reservoir. This action continues until a ball float valve seals the lower end of the air return conduit that causes a negative pressure in the water storage reservoir and stops the flow of water through the water drain conduit.

Water thereafter flows from the water feed reservoir into a growth medium through water feed apertures until the water level in the water feed reservoir drops below the water drain conduit and air is allowed to escape into the water storage reservoir therethrough, whereupon the pressure between the water storage reservoir and the water feed reservoir equalizes, releasing the ball float valve to repeat the cycle. The latent heat generated by the dehydrating roots of the plant evaporates water in the water feed reservoir to allow the water storage reservoir to supply water to the growth medium.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

DESCRIPTION OF THE DRAWINGS

The Figures of the drawings are briefly described as follows.

DETAILED DESCRIPTION OF THE PREFERRED EMBODIMENT

Figure 1A:
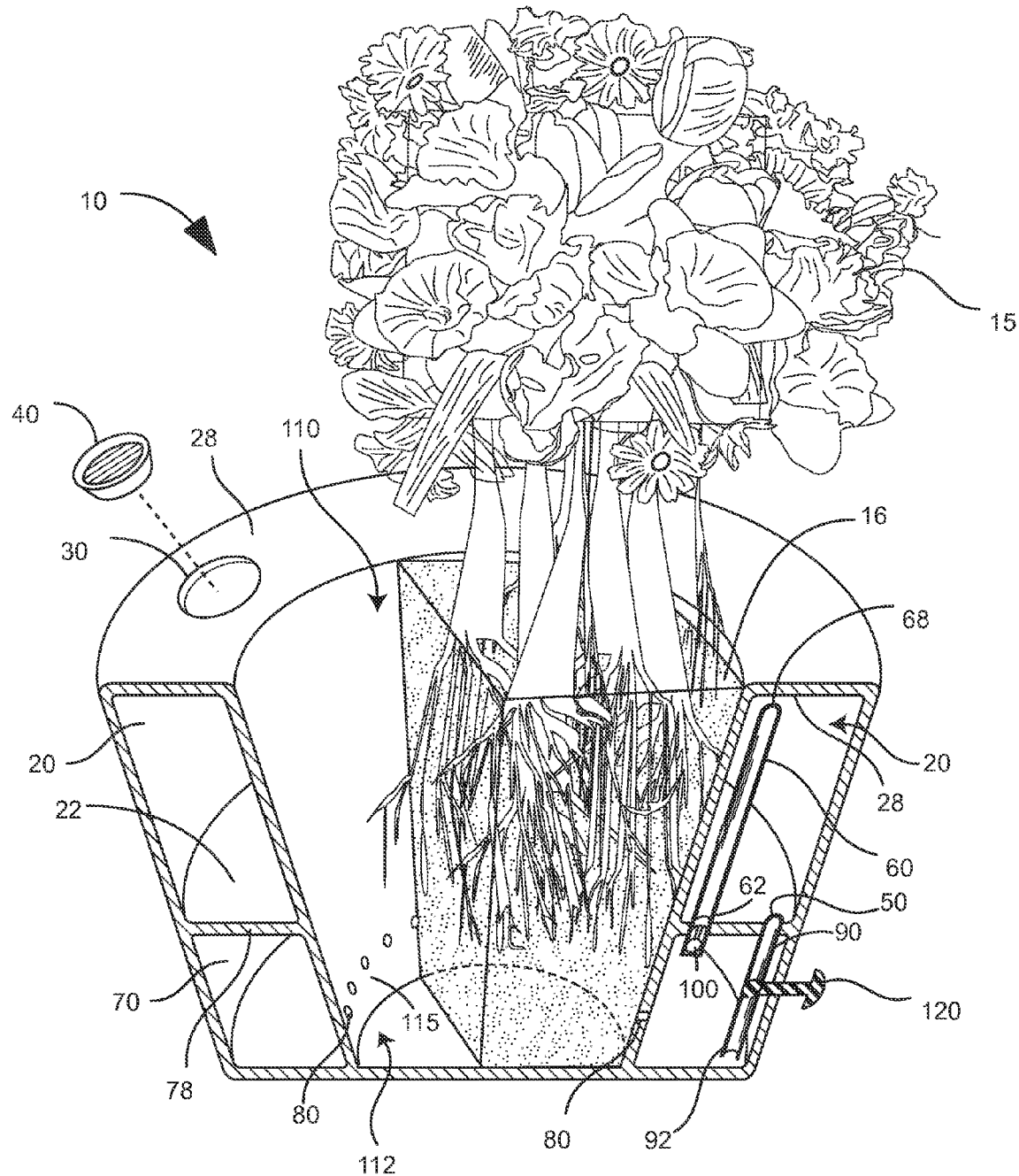
FIG. 1A is a perspective view, with parts in cross section, of a first embodiment of the present invention.

Referring now to the figures, in which like numerals indicate like parts, and particularly to FIGS. 1A, 1B and 2, the present invention will be discussed with reference thereto. An automatic watering system 10 for a plant 15 growing in a growth medium 16, such as soil, is provided. The system 10 comprises a water storage reservoir 20 having a fill aperture 30 in a top portion 28 thereof, a substantially air-tight closure 40 therefore, a reservoir drain opening 50 in a lower portion 22 thereof, an air return conduit 60 traversing the water storage reservoir 20 and terminating at an upper end 68 thereof proximate the top portion 28 of the water storage reservoir 20.

A water feed reservoir 70 is fixed adjacent the plant growth medium 16 and elevationally below the water storage reservoir 20. The water feed reservoir 70 has a plurality of water feed apertures 80 aligned substantially horizontally, at a level depicted in FIG. 1B as $L_2$, for allowing water to pass from the water feed reservoir 70 into the plant growth medium 16. The water feed reservoir 70 is in fluid communication with the water storage reservoir 20 through a water drain conduit 90 fixed to the reservoir drain opening 50 and terminating at a lower end 92 at a horizontal $L_1$ below the plurality of water feed apertures 80. The water drain conduit 90 includes a valve 120 for preventing water from traversing the water drain conduit 90. The water feed reservoir 70 is further in fluid communication with the water storage reservoir 20 through the air return conduit 60, which terminate at a lower end 62 thereof at a horizontal level L3 above the plurality of water feed apertures 80. A float valve 100, such as a ball valve, for example, substantially seals the air return conduit 60 when water reaches a predetermined level in the water feed reservoir 70, and thereafter while urged upward by a negative pressure in the water storage reservoir 20.

With the water storage reservoir 20 substantially filled with water and the air-tight closure 40 substantially sealing the fill aperture 30, the valve 120 is opened and water flows out of the reservoir drain opening 50 through the water drain conduit 90 while air in the water feed reservoir 70 escapes through the air return conduit 60 and into the water storage reservoir 20. As such, the float valve 100 eventually seals the lower end 62 of the air return conduit 60 creating a vacuum condition in the water storage reservoir 20 and stopping the flow of water through the water drain conduit 90. Water in the water feed reservoir 70 thereafter flows into the growth medium 16 through each of the water feed apertures 80 until reaching the level L2. The plant roots begin to dehydrate and create latent heat as they dry out. This condition causes water in the water feed reservoir 70 to evaporate whereby the water level in the water feed reservoir 70 drops below the water drain conduit 90 at L1. Air is then allowed to escape into the water storage reservoir 20 through the water drain conduit 90, whereupon the pressure between the water storage reservoir 20 and the water feed reservoir 70 equalizes, releasing the float valve 100 to repeat the cycle.

Figure 1B:
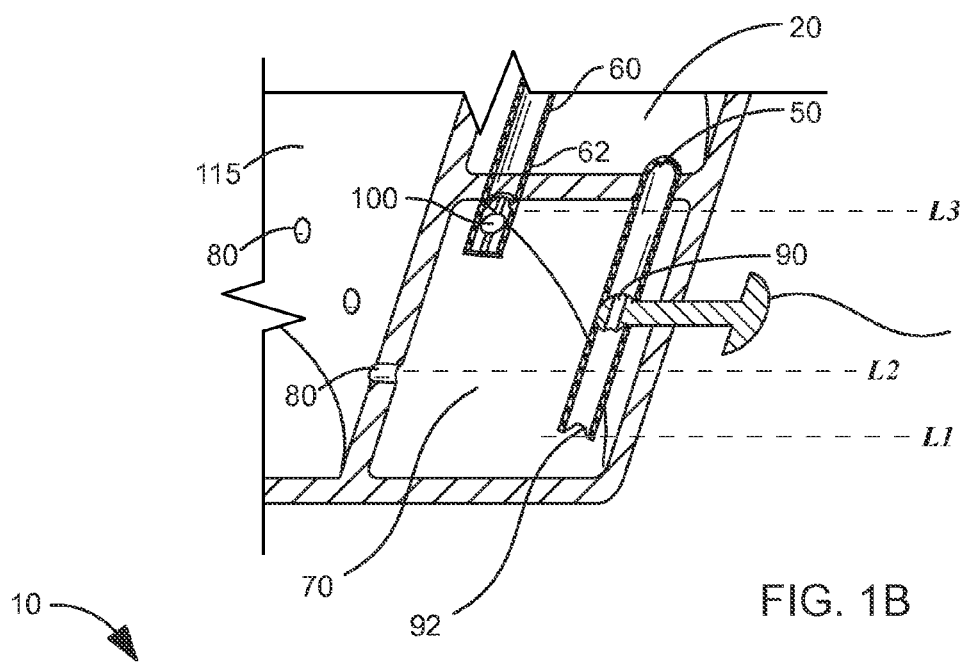
FIG. 1B is a close-up perspective view of a water storage reservoir of the embodiment of FIG. 1A, taken generally along lines 1B-1B of FIG. 1A.

As shown in FIGS. 1A and 1B, the lower portion 22 of the water storage reservoir 20 may constitute an upper portion 78 of the water feed reservoir 70, wherein the water storage reservoir 20 and the water feed reservoir 70 are combined in the same device 10. The water storage reservoir 20 and the water feed reservoir 70 each form a wall 115 of a potted plant container 110, with the apertures 80 of the water feed reservoir 70 each open to a lower portion 112 of the container 10.

Figure 2:
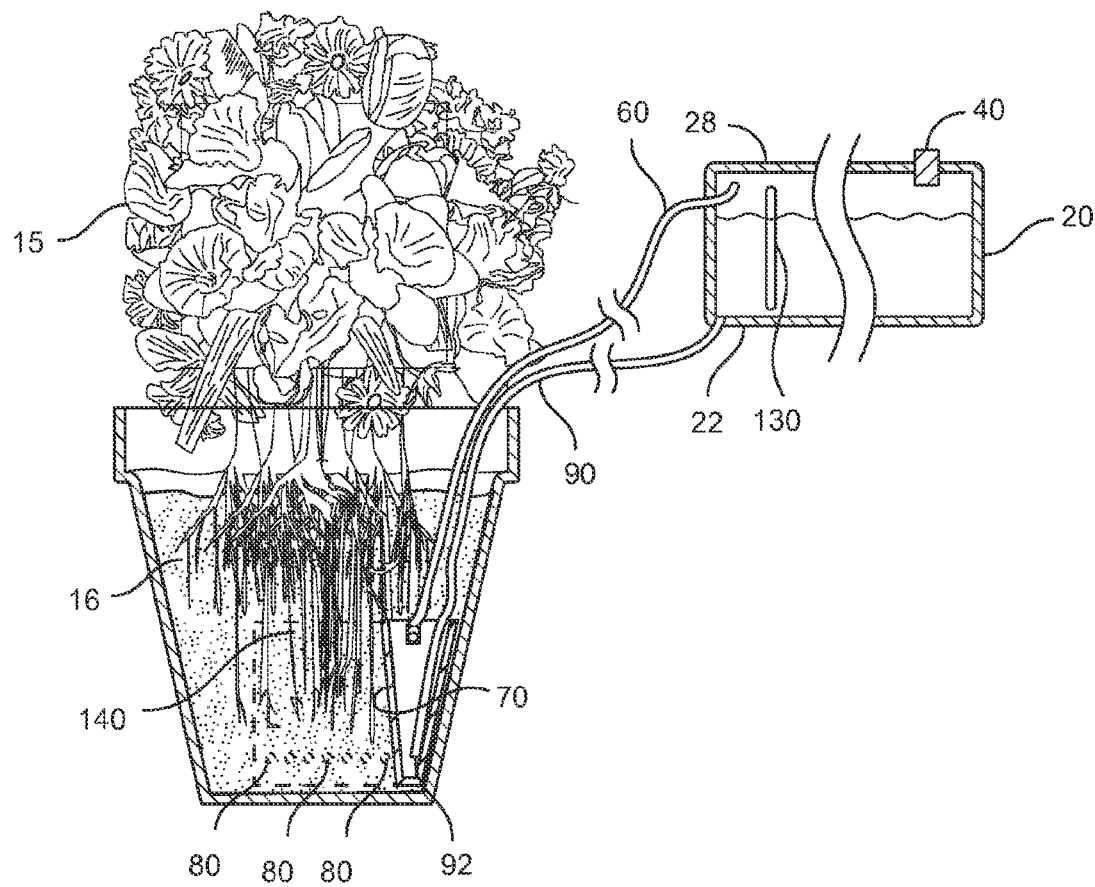
FIG. 2 is an elevational view, with parts in cross section, of a second embodiment of the present invention.

As shown in FIG. 2, the water storage reservoir 20 may be substantially opaque and further includes a portion 130 thereof that is substantially non-opaque, such that a water level within the water storage reservoir 20 is visible therethrough. The water feed reservoir 70 takes the general shape of at least a portion of an annular ring 140, whereby the water feed reservoir 70 may be buried in the growth medium 16 of the potted plant 15. The water storage reservoir 20, in such an embodiment, is located distally and elevationally above the water feed reservoir 70.

In use, the automatic watering system 10 functions as follows:

1. The air-tight closure 40 is removed from the fill aperture 30. The valve 120 is closed to keep water from draining through the water drain conduit 90 into the water feed reservoir 70. Water is added to substantially fill the water storage reservoir 20. The air-tight closure 40 is replaced in the fill aperture 30 to create a closed system.
2. The valve 120 is opened to allow water to drain from the water storage reservoir 20 into the water feed reservoir 70 through the water drain conduit 90 and to create a negative pressure in the water storage reservoir 20. Water flowing out of the water storage reservoir 70 is displaced by air rising up the air return conduit 60.
3. Water in the water feed reservoir 70 rises and pushes the float valve 100 up the air return conduit 60, eventually forcing the float valve 100 to a stop and effectively sealing the air return conduit 60. The weight of water in the water storage reservoir 20 pushing down through the water drain conduit 90 creates a negative pressure (vacuum) in the air-tight water storage reservoir 20 because air is prevented from moving up the air return conduit 60 by the float valve 100 that is sealing the lower end 62. As such, water from the water storage reservoir 20 stops flowing through the water drain conduit 90 into the water feed reservoir 70 since air cannot enter the water storage reservoir 20 to alleviate the negative pressure condition.
4. Through absorption, the plant 15 feeds on the water through the water feed apertures 80. Air can enter the water feed reservoir 70 through the plant growth medium 16 and apertures 80, but air cannot equalize the pressure differential between the water storage reservoir 20 and the water feed reservoir 70 because of the float valve 100 and the water that still covers the lower end 92 of the water drain conduit 90. Eventually the water level drops below the water feed apertures 80.
5. As the plant growth medium 16 starts to dehydrate, the latent heat of the roots evaporates the remaining water in the water feed reservoir 70, eventually dropping the water level below the bottom of the water drain conduit 90 at $L_1$, which is below the water feed apertures 80 by an optionally adjustable distance. Air from the water feed reservoir 70 escapes up the water drain conduit 90 and into the water storage reservoir 20, equalizing the pressure between the water storage reservoir 20 and the water feed reservoir 70.
6. The float valve 110 drops, allowing air to again be displaced up the air return conduit 60. This repeats the cycle as in step 2 and the water refills the water feed reservoir 70.
7. When the water level in the water storage reservoir 20 is low, as may be seen through the non-opaque portion 130 in FIG. 2, the valve 120 is closed, the air-tight closure 40 is removed from the fill aperture 30 and water is added into the water storage reservoir 20 to repeat the process from step 1.

It will be understood that each of the elements described above, or two or more together, may also find a useful application in other types of constructions differing from the type described above. While the invention has been illustrated and described as embodiments of an automatic watering system for a plant, accordingly it is not limited to the details shown, since it will be understood that various omissions, modifications, substitutions and changes in the form and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of the invention.

What is claimed is:

1. An automatic watering system for a plant growing in a growth medium, the system comprising:
   a water storage reservoir having a fill aperture in a top portion thereof, a substantially air-tight closure therefore, a reservoir drain opening in a lower portion thereof, an air return conduit traversing the water storage reservoir and terminating at an upper end thereof proximate the top portion of the water storage reservoir;
   a water feed reservoir fixed adjacent the plant growth medium and elevationally below the water storage reservoir, the water feed reservoir having a plurality of water feed apertures aligned substantially horizontally for allowing water to pass from the water feed reservoir into the plant growth medium, the water feed reservoir in fluid communication with the water storage reservoir through a water drain conduit fixed to the reservoir drain opening and terminating at a lower end at a horizontal level below the plurality of water feed apertures, the water drain conduit including a valve for preventing water from traversing the water drain conduit, the water feed reservoir further in fluid communication with the water storage reservoir through the air return conduit terminating at a lower end thereof at a horizontal level above the plurality of water feed apertures and having a float valve that substantially seals the air return opening when water reaches a predetermined level in the water feed reservoir and thereafter while urged upward by a negative pressure in the water storage reservoir;
   whereby with the water storage reservoir substantially filled with water and the air-tight closure substantially sealing the fill aperture, water flows out of the reservoir drain opening through the water drain conduit and air in the water feed reservoir escapes through the air return conduit and into the water storage reservoir until the float valve seals the lower end of the air return conduit, thereafter causing negative pressure in the water storage reservoir, whereupon water flows into the growth medium through each of the water feed apertures until the water level in the water feed reservoir drops below the water feed apertures, thereafter the growth medium dehydrating causing the water in water feed reservoir to evaporate until the water level in the water feed reservoir drops below the water feed conduit and air is allowed to escape into the water storage reservoir therethrough, whereupon the pressure between the water storage reservoir and the water feed reservoir equalizes, releasing the float valve to repeat the cycle.

2. The automatic watering system of claim 1 wherein the lower portion of the water storage reservoir constitutes an upper portion of the water feed reservoir.

3. The automatic watering system of claim 2 wherein the water storage reservoir and the water feed reservoir each form a wall of a potted plant container, the apertures of the water feed reservoir each open to a lower portion of the container.

4. The automatic watering system of claim 1 wherein the water storage reservoir is substantially opaque and further includes a portion thereof that is substantially non-opaque, such that a water level within the water storage reservoir is visible therethrough.

5. The automatic watering system of claim 1 wherein the water feed reservoir takes the general shape of at least a portion of an annular ring, whereby the water feed reservoir may be buried in the growth medium of a potted plant, the water storage reservoir being located distally and elevationally above the water feed reservoir.

* * * * *